(12) United States Patent
Currier et al.

(10) Patent No.: US 8,304,684 B2
(45) Date of Patent: Nov. 6, 2012

(54) PLASMA ARC TORCH ROTATIONAL ASSEMBLY

(75) Inventors: Brian J. Currier, Newport, NH (US); Ross A. Smith, Sutton, NH (US); Jeremy Beliveau, Enfield, NH (US); Jon W. Lindsay, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 374 days.

(21) Appl. No.: 12/748,839

(22) Filed: Mar. 29, 2010

(65) Prior Publication Data

US 2010/0243619 A1 Sep. 30, 2010

Related U.S. Application Data

(60) Provisional application No. 61/211,218, filed on Mar. 27, 2009.

(51) Int. Cl.
*B23K 9/00* (2006.01)

(52) U.S. Cl. ......... 219/121.48; 219/121.11; 219/121.12; 219/121.36; 219/121.44; 219/121.5; 219/121.52; 219/121.54; 219/121.58; 219/121.59

(58) Field of Classification Search ............. 219/121.48, 219/121.11, 121.12, 121.36, 121.58, 121.39, 219/121.44, 121.5, 121.52, 121.54, 121.59
See application file for complete search history.

(56) References Cited

U.S. PATENT DOCUMENTS

| 3,835,666 | A | | 9/1974 | Hoffman |
| 4,549,068 | A | | 10/1985 | Kensrue |
| 4,650,959 | A | * | 3/1987 | Swensrud et al. ......... 219/125.1 |
| 4,656,329 | A | | 4/1987 | Moerke |
| 4,792,657 | A | | 12/1988 | Conley |
| 4,901,719 | A | | 2/1990 | Trenconsky et al. |
| 4,912,296 | A | * | 3/1990 | Schlienger ............... 219/121.59 |
| 5,468,929 | A | * | 11/1995 | Brolund et al. .......... 219/121.56 |
| 5,484,220 | A | | 1/1996 | Lewis et al. |
| 5,494,367 | A | | 2/1996 | Epkens |
| 5,718,831 | A | | 2/1998 | Zigliotto |
| 5,772,350 | A | | 6/1998 | Ferguson et al. |
| 6,772,040 | B1 | * | 8/2004 | Picard et al. .................. 700/166 |
| 7,665,996 | B2 | | 2/2010 | Jaeger |
| 2004/0104203 | A1 | * | 6/2004 | Yamaguchi et al. ..... 219/121.36 |

FOREIGN PATENT DOCUMENTS

DE 202006018163 U1 3/2007
EP 1568449 A1 8/2005

OTHER PUBLICATIONS

International Search Report for PCT/US2010/029019 mailed Jul. 6, 2010, 5 pages.

* cited by examiner

*Primary Examiner* — Long Tran
(74) *Attorney, Agent, or Firm* — Proskauer Rose LLP (57) ABSTRACT

A plasma torch rotation assembly for relieving stress on a lead. The rotation assembly can include an outer housing, which can have a mounting surface adapted to be fixedly coupled to a torch mount. The rotation assembly can include an inner component disposed at least partially within the outer housing, and a bearing structure disposed between the outer housing and the inner component. The bearing structure can facilitate rotational movement of the outer housing relative to the inner component, about a longitudinal axis of the rotation assembly. The rotation assembly can include a torch adapter disposed near a first end of the inner component. The torch adapter can be adapted to mate with a plasma arc torch. The rotation assembly can include a receiving portion disposed at a second end of the inner component, the receiving portion adapted to receive at least a portion a lead.

17 Claims, 9 Drawing Sheets

PLASMA ARC TORCH ROTATIONAL ASSEMBLY

RELATED APPLICATIONS

This application claims the benefit of U.S. Provisional Application Ser. No. 61/211,218, entitled "Rotational Plasma Torch Mount Sleeve," filed on Mar. 27, 2009. The entire disclose of U.S. Provisional Application Ser. No. 61/211,218 is incorporated herein by reference.

TECHNICAL FIELD

The present invention relates to a rotational plasma arc torch mount sleeve assembly for use in automated plasma arc cutting systems.

BACKGROUND

Figure 1:
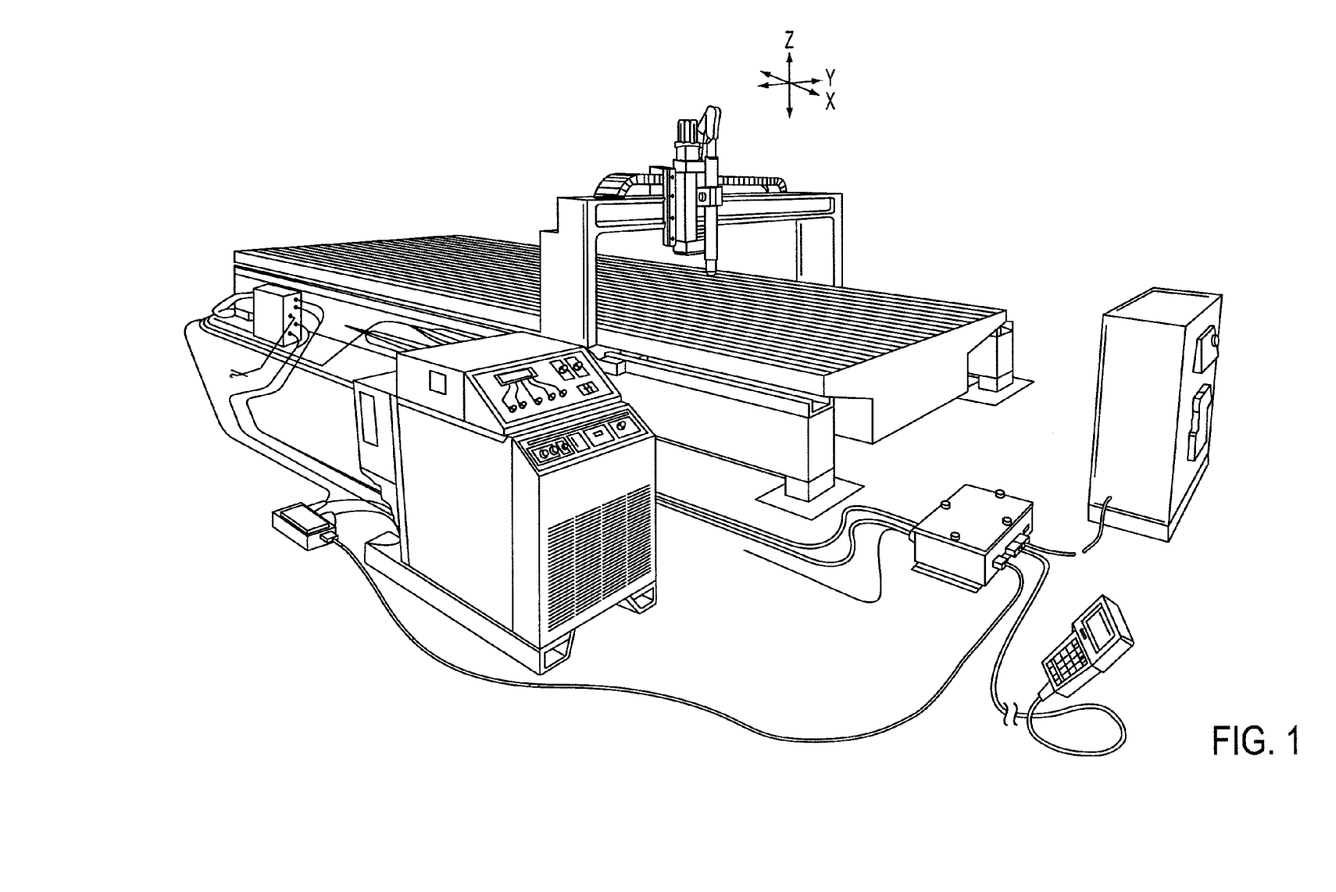
FIG. 1 is a schematic diagram of an automated plasma arc cutting system.

Plasma arc cutting systems are widely used for cutting metallic materials and can be automated for automatically cutting a metallic workpiece. In general, a plasma arc cutting system includes a plasma arc torch, an associated power supply, a remote high-frequency (RHF) console, a gas supply, a positioning apparatus, a cutting table, a torch height control, and an associated computerized numeric controller. FIG. 1 shows an example of a plasma arc cutting system.

In operation, a user places a workpiece on the cutting table and mounts the plasma arc torch on the positioning apparatus or motion control mount to provide relative motion between the tip of the torch and the workpiece to direct the plasma arc along a processing path. The user provides a start command to the computerized number controller (CNC) to initiate the cutting process. The CNC accurately directs motion of the torch and/or the cutting table to enable the workpiece to be cut to a desired pattern. The CNC is in communication with the positioning apparatus. The positioning apparatus uses signals to the CNC to direct the torch along a desired cut path. Position information is returned from the positioning apparatus to the CNC to allow the CNC to operate interactively with the positioning apparatus to obtain an accurate cut path.

The power supply provides the electrical current necessary to generate the plasma arc. The power supply has one or more dc power modules to produce a constant current for the torch. Typically, the current can be set to discreet values. The power supply has a microprocessor, which regulates essentially all plasma system functions, including start sequence, CNC interface functions, gas and cut parameters, and shut off sequences. For example, the microprocessor can ramp-up or ramp-down the electrical current. The main on and off switch of the power supply can be controlled locally or remotely by the CNC. The power supply also houses a cooling system for cooling the torch.

The gas console controls flow of plasma and shield gases to the torch. The gas console houses solenoid valves, flow meters, pressure gauges, and switches used for plasma and shield gas flow control. The flow meters are used to set the preflow rates and cut flow rates for the plasma and shield gases. The gas console also has a multi-inlet gas supply area where the required plasma and shield gases can be connected. A toggle switch can be used to select the plasma gases. The plasma and shield gases are monitored by gas pressure gages.

The RHF console houses a high frequency starting circuit that is used to fire the torch. The RHF console also houses a cathode manifold used to interface power and coolant leads between the power supply and the torch. The power and coolant leads and a pilot arc lead make up a shielded torch lead set which connects with the torch. In addition, gas lines are also supplied to the torch to supply gas.

Plasma arc torch systems use a positional apparatus such as a motion driving system to control the motion of the torch. The motion driving system can include a torch height control that controls the height of the torch relative to the workpiece. It can also position the tip of the torch proximate the workpiece, move the torch about the surface of the workpiece, and control torch angles, such as bevel.

In bevel and robotic applications, the torch movement can involve 6-axis maneuverability. For example, when a bevel or chamfer cut is made, the edge of the workpiece is not perpendicular. Instead, the edge of the workpiece is cut at an angle, for example at a 45 degree angle. Cutting a workpiece at an angle requires the torch to rotate or swivel on an axis that is not used for traditional, straight edge plasma torch cutting. These additional axes of maneuverability in bevel and robotic applications can cause stress or wear of the lead set due to the excess twisting and rotating in these applications. This can lead to early lead set failure.

The plasma arc torch generally includes a torch body, an electrode mounted within the body, passages for cooling fluid and cut and shield gases, a swirl ring to control the fluid flow patters, a nozzle with a central exit orifice, and electrical connections. A shield can also be provided around the nozzle to protect the nozzle and to provide a shield gas flow to the area proximate the plasma arc. Gases applied to the torch can be non-reactive (e.g., argon or nitrogen) or reactive (e.g., oxygen or air).

The plasma arc cutting system described above can be used in cutting applications that involve 6-axis maneuverability, including bevel, chamfer, and robotic applications. This type of maneuverability results in extreme twisting and bending of the lead set, which causes the lead sets to fail prematurely. Prior solutions require complex programming to determine the number of rotations a torch has made during a cutting process, so that the system can pause and "unwind" the lead set at regular intervals in the hopes of preventing excessive premature failure of the lead set. Failure of the lead set and pausing to "unwind" the lead set results in unwanted and costly downtime of the system and is only minimally effective.

SUMMARY OF THE INVENTION

Accordingly, a long-felt need exists for a torch system that easily and efficiently accommodates the rotational movements of bevel and robotic cutting systems. The present invention relates to a rotational plasma arc torch mount sleeve assembly for use in an automated plasma arc cutting system. In particular, the invention relates to a universal torch mount sleeve assembly that can be used in, for example, bevel and robotic applications. The universal torch mount sleeve assembly can greatly increase the range of bevel cut angles that are available. The universal torch mount sleeve assembly can be easily implemented on most existing and new motion control mounts, and embodiments of the invention do not require system-specific rotational mounting structure designs. In addition, the rotational plasma arc torch mount sleeve assembly reduces or eliminates failure to the lead set and does not require the system to be paused to "unwind" the lead set.

The invention, in one aspect, features a plasma torch rotation assembly that includes an outer housing. The outer housing can include a mounting surface adapted to be fixedly coupled to a torch mount on a plasma arc torch motion driving system. The rotation assembly can also include an inner component disposed at least partially within the outer housing, the inner component having a first end and a second end. The rotation assembly can also include a bearing structure disposed between the outer housing and the inner component. The bearing structure can facilitate a rotational movement of the outer housing with respect to the inner component, about a longitudinal axis of the rotation assembly. The plasma torch rotation assembly can also include a torch adapter disposed near the first end of the inner component, the torch adapter adapted to mate with a plasma arc torch. The rotation assembly can also include a receiving portion disposed at the second end of the inner component, the receiving portion adapted to receive at least a portion a lead set.

In some embodiments the plasma torch rotation assembly further includes a plasma torch receptacle adapted to mate with the torch adapter. In some embodiments, the plasma torch receptacle includes a torch connector at a first end of the plasma torch receptacle to mate with the plasma arc torch, and a lead set connector at a second end of the plasma torch receptacle to mate with the lead set.

In one embodiment the torch adapter can comprise a quick disconnect. In some embodiments the outer housing is adapted to be fixedly coupled within the torch mount. In other embodiments the torch mount is integrated into the outer housing. In some embodiments the outer housing includes a fastener pattern adapted to align and affix the outer housing to the torch motion driving system.

In some embodiments the plasma torch rotation assembly includes a plurality of conduits disposed within the outer housing and the inner component.

In some embodiments, the bearing structure has a radial tolerance limit of between about 0.001 and about 0.002 inches. In some embodiments the bearing structure is at least one of a journal bearing, sleeve bearing, rifle bearing, bushing, ball bearing, or roller bearing. In one embodiment the bearing structure facilitates 360 degree rotational movement of the outer housing with respect to the inner component about the longitudinal axis of the rotation assembly. In other embodiments the inner component is fully rotational relative to the outer housing about the longitudinal axis of the rotation assembly. The bearing structure can include a solid polymer. The bearing structure can also include Ertalyte.

In some embodiments the outer housing and the inner component are generally cylindrical. In other embodiments the outer housing is generally D-shaped. When the outer housing is generally D-shaped, the fastener pattern can be used to align and affix the outer housing to the torch motion driving system. In some embodiments, a clamp is used to align and affix the outer housing to the torch motion driving system.

In some embodiments the plasma torch rotation assembly is permanently affixed to, or integrally formed with, the lead set. In other embodiments the plasma torch rotation assembly is permanently affixed to, or integrally formed with, the plasma torch body. In one embodiment the plasma torch rotation assembly is permanently affixed to, or integrally formed with, a plasma torch sleeve.

Another aspect of the invention features a method of installing a plasma torch rotation assembly. The method can include providing the plasma torch rotation assembly, for example, the plasma torch rotation assembly described above. The method can also include receiving a lead set via the receiving portion of the inner component. The method can further include fixedly securing the outer housing to the torch mount of the plasma arc torch cutting system. The method can also include connecting the torch adapter of the inner component to the plasma arc torch. The method steps can be performed in any order.

The invention, in another aspect, features a plasma torch rotation assembly. The rotation assembly can include an outer housing having a mounting surface adapted to be fixedly coupled to a torch mount on a plasma arc torch motion driving system. The rotation assembly can also include an inner component disposed at least partially within the outer housing, the inner component having a first end and a second end. In some embodiments the inner component is fully disposed within the outer housing. The rotation assembly can also include a means for providing a rotational movement of the outer housing with respect to the inner component, about a longitudinal axis of the rotation assembly. The plasma torch rotation assembly can also include a torch adapter disposed near the first end of the inner component, the torch adapter adapted to mate with a plasma arc torch. The rotation assembly can also include a receiving portion disposed at the second end of the inner component, the receiving portion adapted to receive a lead set.

The invention in another aspect features a universal rotational plasma torch sleeve connectable to a plasma torch mount. The torch sleeve can include a torch sleeve body having a first end and a second end. The first end of the torch sleeve body can be adapted to receive a plasma torch. The second end the torch sleeve body can be adapted to couple to at least a portion of a lead set. The torch sleeve can also include a mounting surface of the torch sleeve body rotatable relative to the torch sleeve body, the mounting surface sized to be received by a variety of standardized torch mounts that are designed to hold and manipulate non-rotational torch sleeves.

BRIEF DESCRIPTION OF THE DRAWINGS

The foregoing and other objects, features and advantages of the invention, as well as the invention itself, will be more fully understood from the following illustrative description, when read together with the accompanying drawings which are not necessarily to scale.

DETAILED DESCRIPTION

Figure 2:
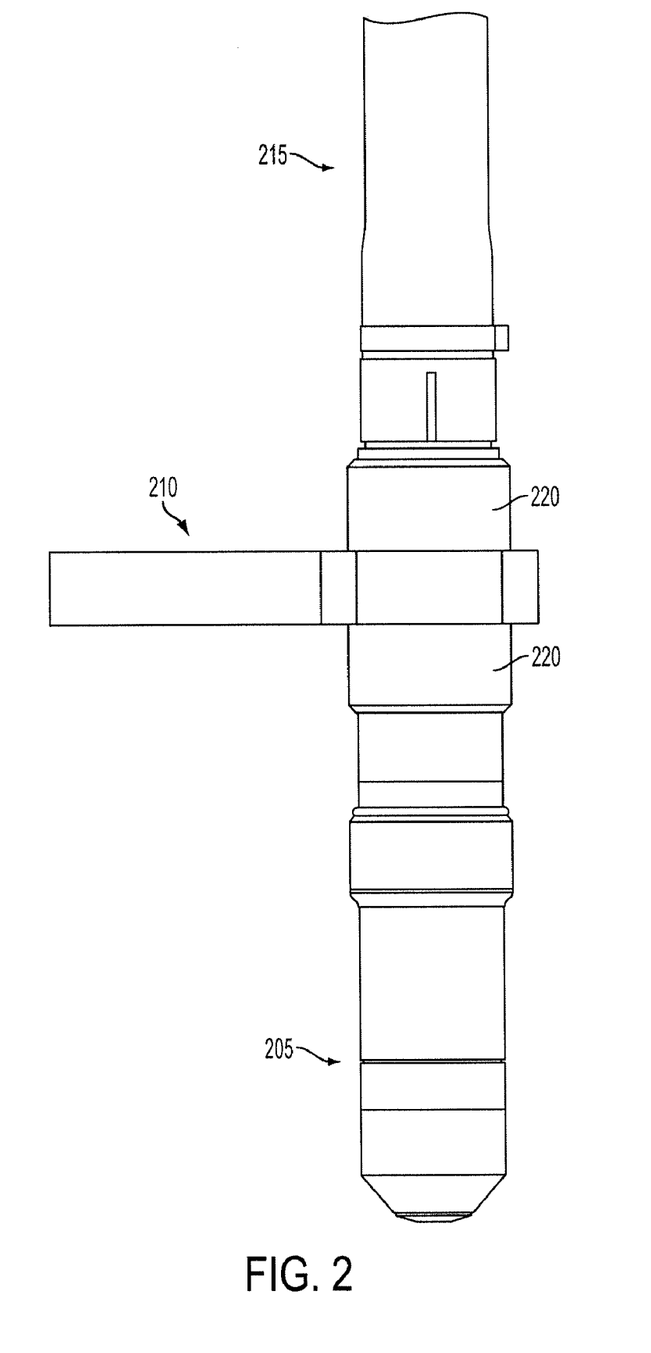
FIG. 2 is a side view of an embodiment of the invention, depicting a plasma arc torch, motion control mount, and a lead set that incorporates a rotation assembly.

One aspect of the invention features a plasma torch rotation assembly. FIG. 2 is a side view of an embodiment of the invention, depicting a plasma arc torch 205, motion control mount 210, and a lead set 215 that incorporates a rotation assembly 220. In some embodiments a lead set 215 is connected to one end of a rotation assembly 220. In one embodiment, the plasma torch rotation assembly 220 is permanently affixed to or integrally formed with the lead set 215. One benefit of permanently affixing or integrally forming the lead set 215 with the rotation assembly 220 includes limiting the amount of assembly required by the customer. In other embodiments, the rotation assembly 220 is capable of being removed from the lead set 215. The removable nature of the rotation assembly 220 from the lead set 215 allows easy access to the rotation assembly 220 and lead set 215 to facilitate repair or replacement.

The other end of the rotation assembly 220 can be connected to a plasma arc torch 205. In some embodiments the plasma torch rotation assembly 220 is permanently affixed to or integrally formed with the plasma torch body 205, which can limit the amount of assembly required by the customer. In other embodiments, the plasma torch rotation assembly 220 is capable of being removed from the plasma arc torch 205. The removable nature of the rotation assembly 220 from the torch 205 facilitates repair or replacement of the rotation assembly 220 or the torch 205 with minimal down time to the system as a whole.

In some embodiments, the outer housing (for example, 305 of FIGS. 3 and 4) of the rotation assembly 220 is adapted to be fixedly coupled within the motion control mount 210. For example a clamp can be used to fixedly couple the motion control mount 210 to the rotation assembly 220. In other embodiments, bolts can be used to fixedly couple the motion control mount 210 to the rotation assembly 220. In other embodiments, the motion control mount 210 is integrated into the outer housing. For example, the motion control mount 210 can be integrally formed with the outer housing. When the motion control mount 210 is integrated into the outer housing there is no need for a clamp, bolt or other fastener to couple the motion control mount 210 to the rotation assembly 220. The integral assembly reduces the risk of overtightening the clamp, bolt or other fasteners and damaging the rotation assembly.

Figure 3:
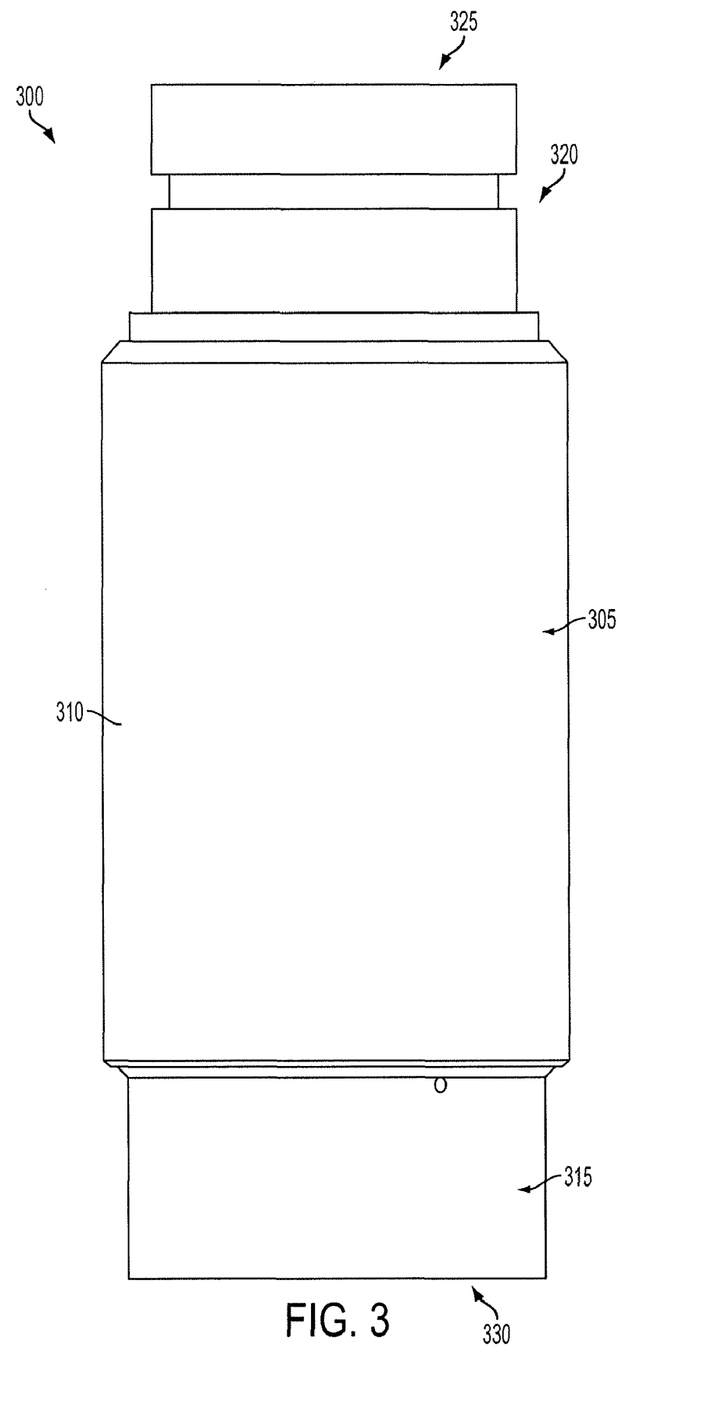
FIG. 3 is a side view of a plasma torch rotation assembly, according to one embodiment of the present invention.

FIG. 3 is a side view of a plasma torch rotation assembly 300, according to one embodiment of the present invention. In one embodiment, the plasma torch rotation assembly 300 comprises an outer housing 305 and an inner component (not shown). The outer housing 305 can have a mounting surface 310. In one embodiment, the mounting surface 310 is fixedly coupled to a torch mount (e.g., the motion control mount 210 of FIG. 2) on a plasma arc torch motion driving system (e.g., the plasma arc torch motion driving system of FIG. 1). In another embodiment, the mounting surface 310 is removably coupled to a torch mount on a plasma arc torch motion driving system. In one embodiment the mounting surface 310 is elongated. In one embodiment the length of the mounting surface is about 3.5 inches.

In one embodiment the inner component has a torch adapter 315. The torch adapter 315 is disposed at one end of the inner component, for example, the torch adapter 315 can be disposed at a first end 330 of an inner component. In one embodiment, the torch adapter 315 is adapted to mate with a plasma arc torch. In another embodiment, the torch adapter 315 is adapted to mate with any other type of torch, for example, a MIG torch or a welding torch. In some embodiments the torch adapter 315 is comprised of threads. In other embodiments the torch adapter 315 is comprised of any other type of fastener that is capable of mating with a plasma arc torch.

In some embodiments, the plasma torch rotation assembly 300 comprises a torch sleeve or a fixed leads mount 320. In some embodiments a first end (not shown) of a torch sleeve 320 is adapted to receive a plasma torch. In some embodiments a second end 325 of a torch sleeve 320 is adapted to couple to at least a portion of a lead set. The plasma torch rotation assembly 300 can be permanently affixed to or integrally formed with a plasma torch sleeve 320. In some embodiments the plasma torch rotation assembly 300 can be adapted to be removed from the plasma torch sleeve 320. The plasma torch sleeve 320 can have a length of about 3 inches to about 24 inches. In some embodiments the plasma torch sleeve 320 has a length of about 12 inches.

The plasma torch sleeve 320 can be coupled directly to the plasma arc torch. The rotation assembly can be positioned around the plasma torch sleeve 320 to allow rotation of the outer housing with respect to the inner component or plasma torch sleeve 320. In some embodiments, the inner component is the plasma torch sleeve 320. This embodiment can allow the rotation assembly to be implemented into existing torch systems without adding extra length between the lead set or torch sleeve and the torch.

Figure 4:
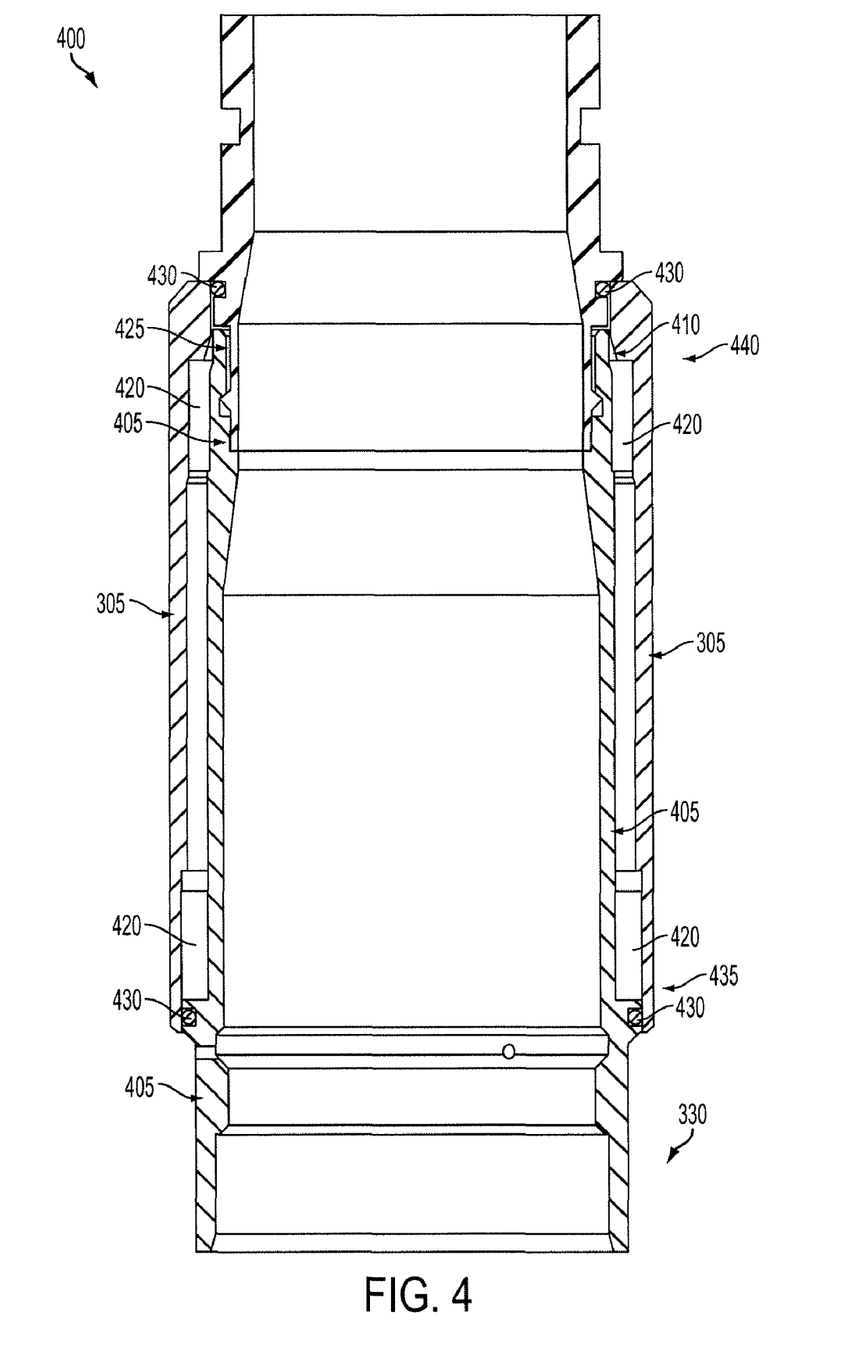
FIG. 4 is a cross-sectional view of a plasma torch rotation assembly, according to one embodiment of the present invention.

FIG. 4 is a cross-sectional view of a plasma torch rotation assembly 400, according to one embodiment of the present invention. In some embodiments, the plasma torch rotation assembly comprises an inner component 405. In one embodiment, the inner component 405 is disposed at least partially within the outer housing 305. In another embodiment, the inner component 405 is disposed completely within the outer housing 305. The inner component 405 can have a first end 330 and a second end 410. In some embodiments, the inner component 405 comprises a receiving portion 425 at the second end 410 of the inner component 405. The inner component can be made of stainless steel. In one embodiment, the receiving portion 425 is adapted to receive at least a portion of a lead set.

In some embodiments the outer housing and the inner component are generally cylindrical. When the outer housing is generally cylindrical, a clamp can be used to align and affix the outer housing to the torch motion driving system. An operator should take caution when applying the clamp to make sure not to overtighten the clamp. If a clamp is placed on too tightly, it may damage the plasma torch rotation assembly.

To prevent possible overtightening when a clamp is used to align and affix the outer housing to the torch motion driving system, embodiments include an outer housing that is generally D-shaped, i.e., has a D-shaped cross-sectional configuration. When the outer housing is generally D-shaped, sides of the outer housing can have additional mass. One side of the housing can be generally flat. In one embodiment the outer housing includes a fastener pattern, e.g., on a flat side of the D-shaped configuration, which can be adapted to align and affix the outer housing to a mount of the torch motion driving system. In one embodiment the fastener configuration includes bolt holes. Other embodiments include studs, radial clamping, or bolt holes that are pre-threaded. In one embodiment the bolt holes are in a three bolt configuration. The mount connecting structure, for example, the bolt holes or studs, can be on the outer housing of the plasma torch rotation assembly.

When a generally D-shaped outer housing is used with a fastener pattern, embodiments include configurations in which a clamp is not needed to align and affix the outer housing to the torch motion driving system. This eliminates the chance of crushing or breaking the plasma torch rotation assembly by over-tightening the clamp.

In some embodiments a bearing structure 420 is disposed between the outer housing 305 and the inner component 405. In other embodiments, other means for providing a rotational movement of the outer housing 305 with respect to the inner component 405, about a longitudinal axis of the rotation assembly are used. The bearing structure 420 can be positioned on the inner component 405 by an interference fit. The bearing structure 420 can facilitate rotational movement of the outer housing 305 relative to the inner component 405. In some embodiments the rotational movement occurs about a longitudinal axis of the plasma torch rotation assembly 400. The bearing structure 420 can be any type of bearing that can facilitate rotational movement. For example, the bearing structure 420 can be at least one of a journal bearing, sleeve bearing, rifle bearing, bushing, ball bearing, or roller bearing. In some embodiments only one type of bearing is used. In other embodiments more than one type of bearing can be used, for example, a ball bearing and a roller bearing. In one embodiment only one bearing structure 420 is located between the outer housing 305 and the inner component 405. In other embodiments, more than one bearing structure 420 is located between the outer housing 305 and the inner component 405. In one embodiment two bearing structures are located between the outer housing 305 and the inner component 405. One bearing structure 420 is located at a first end 435 of the outer housing 305 and one bearing structure 420 is located at a second end 440 of the outer housing 305.

The bearing structure 420 can facilitate 360 degree rotational movement of the outer housing 305 with respect to the inner component 405 about the longitudinal axis of the rotation assembly. 360 degree rotational movement allows the outer component to rotate from 0 degrees to 360 degrees in either a clockwise or counterclockwise rotation.

In some embodiments the inner component 405 is fully rotational relative to the outer housing 305 about the longitudinal axis of the rotation assembly. In other embodiments the outer housing 305 is fully rotational relative to the inner component 405. Full rotational capability allows the inner component to rotate countless times within the outer housing in either direction, without hindrance from the assembly. Full rotational capability prevents early failure of the lead set due to cable stress imposed from the assembly, since the lead set does not become twisted. In addition, full rotational capability prevents the need to pause the system to "unwind" the lead set, thus preventing downtime of the system.

The ability of either the inner component or outer housing to be fully rotational relative to the outer housing or inner component respectfully greatly increases the life of the lead set. For example, when a non-rotational torch sleeve is used, the lead set typically fails around 2,300 cycles, rotations, or movements. This is because significant stress is placed on the lead set when it gets wound up due to the rotations required to accurately cut a workpiece. In contrast, when the rotational assembly was used, the lead set did not fail through 11,000 cycles, rotations, or movements. The rotational assembly relieves the stress placed on the lead set because the rotational assembly rotates without rotating the lead set or torch. In other words, the torch and lead set rotate together and rotate independently from the mount. In addition, if the lead set or torch is rotated while the rotational assembly is in place, the rotational assembly allows the lead set and torch to "unwind" or rotate in an opposite direction without having to use a lead unwind feature, e.g., that pauses the cutting operation of the torch to unwind the lead set and torch based on the history of specific movements or rotations the torch has made to cut the workpiece. Lead unwind features are difficult and require complicated algorithms within the CNC. Incorporating a rotational assembly greatly simplifies the programming required within the CNC.

The plasma torch rotation assembly 400 can also comprise a seal 430 located between the inner component 405 and the outer housing 305. In one embodiment more than one seal 430 is located between the inner component 405 and the outer housing 305. The seal 430 can prevent dust or other contaminants from entering the plasma torch rotation assembly 400. Dust and contaminants can hinder the plasma torch rotation assembly 400 from rotating due to, for example, added friction at the bearings. The seals can be fixed to the inner and outer housing further decreasing the potential for dust and contaminants to hinder the plasma torch rotation assembly or operation of the plasma arc torch.

In some embodiments the bearing structure 420 includes a solid polymer which allows for a small cross section. For example, the cross section of a solid polymer bearing can be 0.500 inches wide by 0.125 inches thick. In some embodiments, the outer diameter of the bearings is machined to a final dimension after being installed on the inner component 405. This allows for accurate positional placement. In some embodiments the bearing structure 420 has a radial tolerance limit of between about 0.001 and about 0.002 inches (therefore the bearing structure 420 would have a diametral tolerance of between about 0.002 and about 0.004 inches).

In one embodiment the bearing structure includes Ertalyte, available from Quadrant Engineering Plastic Products, in Reading, Pa. Ertalyte has strong bearing characteristics, for example, it has excellent wear resistance, a low coefficient of friction, and excellent dimensional stability. Alternative materials having these characteristics can also be used in the bearing structure.

Figure 5:
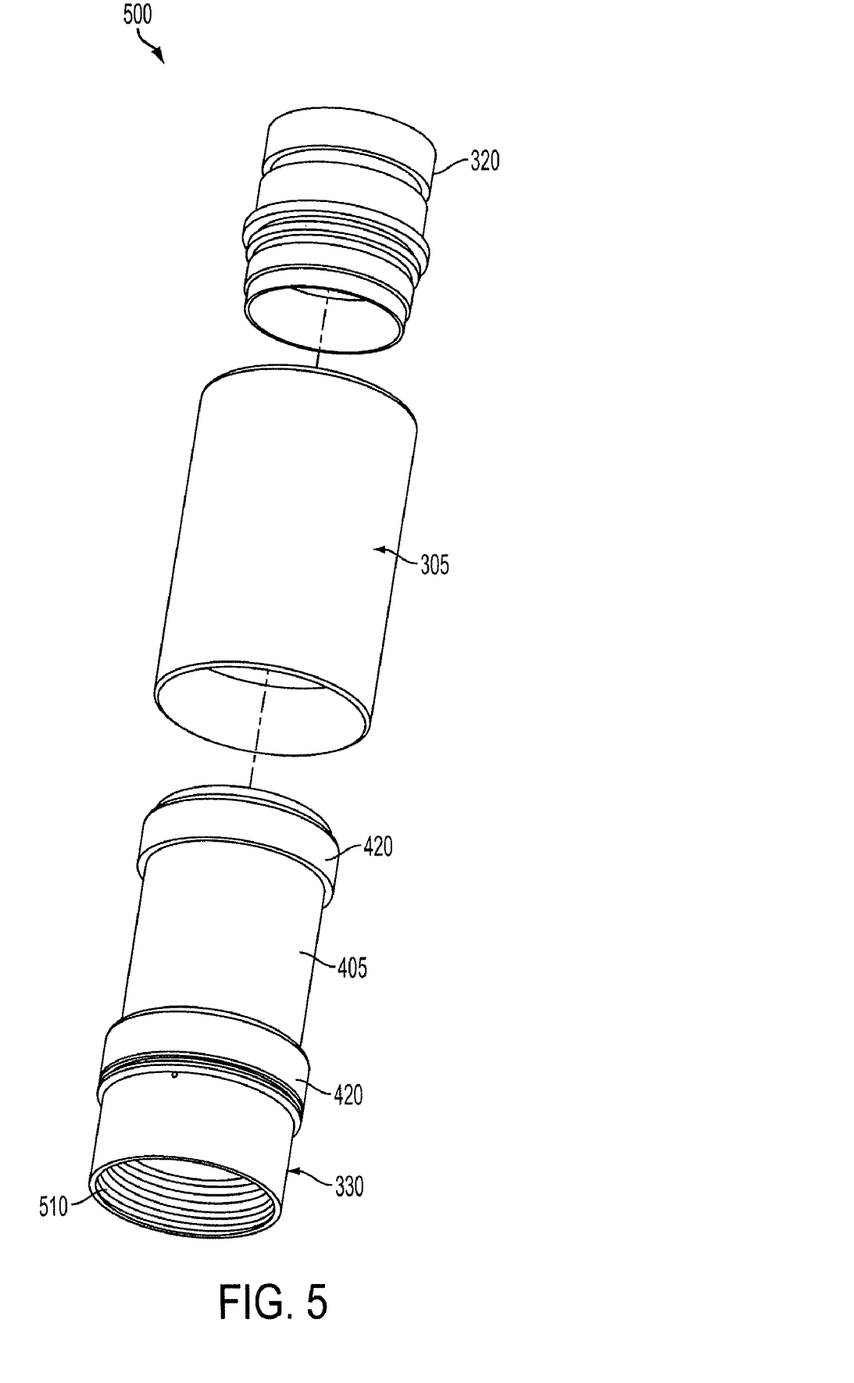
FIG. 5 is an exploded view of components of a plasma torch rotation assembly, according to one embodiment of the present invention.

FIG. 5 is an exploded view of the components of a plasma torch rotation assembly 500, according to one embodiment of the present invention. As discussed above, the plasma torch rotation assembly 500 comprises an inner component 405 that is sized to fit at least partially within the outer housing 305. In some embodiments the inner component 405 comprises bearing structures 420 that facilitate rotation of the outer housing around the inner component. In some embodiments the plasma torch rotation assembly 500 also comprises a torch sleeve or fixed leads mount 320 that is adapted to couple to the lead set (not shown).

In some embodiments the inner component 405 has a torch adapter 510 disposed near the first end 330 of the inner component 405. The torch adapter 510 is adapted to mate with a torch, such as a plasma arc torch, a MIG torch, or a welding torch. An embodiment of the torch adapter 510 can use a simple threaded structure. Additional exemplary embodiments are also described herein. For example, in some embodiments the torch adapter 510 is adapted to mate with a plasma torch receptacle, such as the plasma torch receptacles depicted in FIGS. 6A-C. In some embodiments, the torch adapter comprises a quick disconnect. The quick disconnect allows the torch to be easily and rapidly removed from the plasma torch rotation assembly to facilitate repair or replacement of the plasma arc cutting system. The torch can be removed from a torch sleeve or a rotational assembly without removing the torch sleeve or the rotational assembly from the torch mount.

Figure 6A:
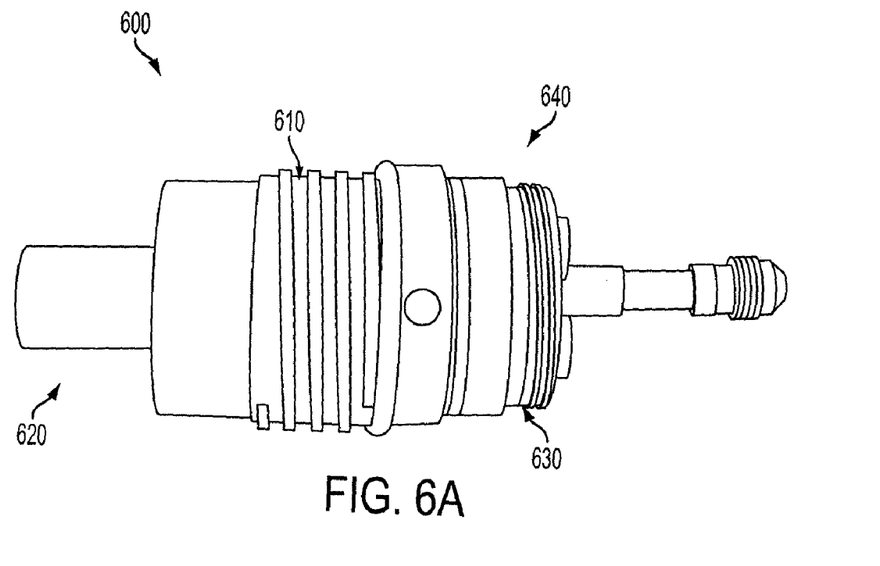
FIG. 6A is a side view of a torch receptacle, according to one embodiment of the present invention.

FIG. 6A is a side view of a plasma torch receptacle 600, according to one embodiment of the present invention. In some embodiments, the plasma torch rotation assembly includes a plasma torch receptacle 600 that is adapted to mate with a torch adapter (for example, the torch adapter 510 of FIG. 5). In some embodiments the plasma torch receptacle 600 comprises a torch connector 610 at a first end 620 of the plasma torch receptacle 600. The torch connector 610 can be adapted to mate with a plasma arc torch. In some embodiments the plasma torch receptacle 600 comprises a lead set connector 630 at a second end 640 of the plasma torch receptacle 600. The lead set connector 630 can be adapted to mate with a lead set. In some embodiments the torch connector 610 and the lead set connector 630 comprise threads. In other embodiments, the torch connector 610 and the lead set connector 630 comprise other fasteners capable of connecting to a torch and a lead set respectively.

Figure 6B:
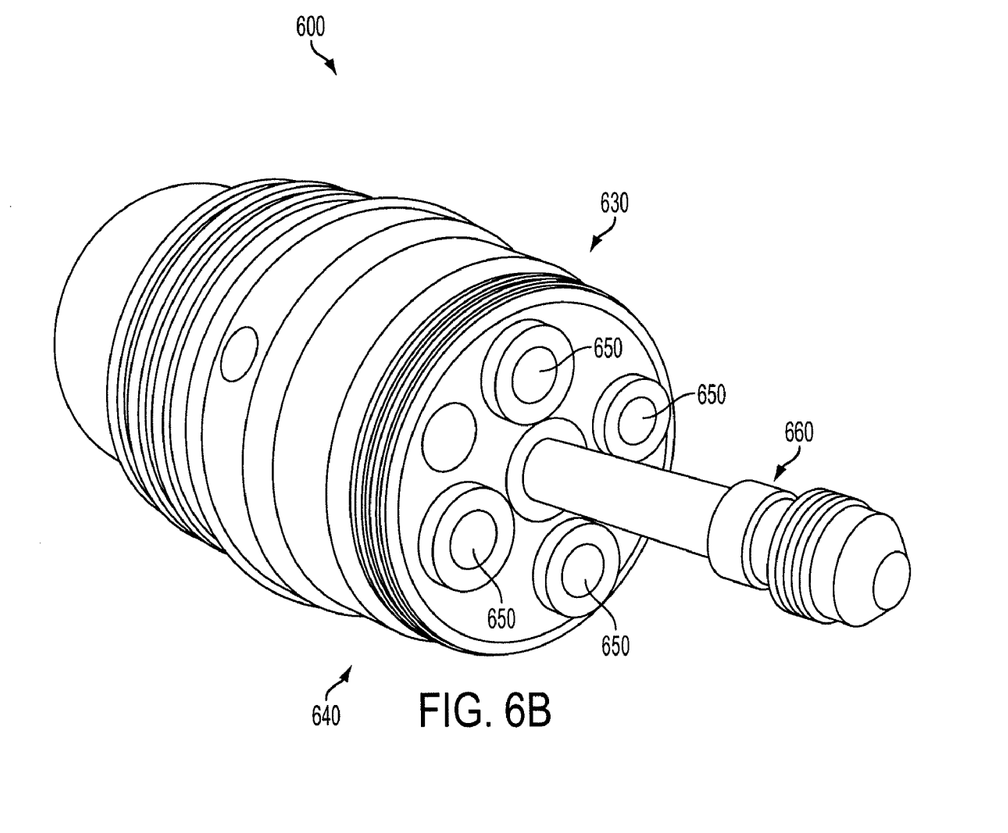
FIG. 6B is a perspective view of a short lead set connector of a torch receptacle, according to one embodiment of the present invention.

FIG. 6B is a perspective view of a short lead set connector 630 of a torch receptacle 600, according to one embodiment of the present invention. The lead set connector 630, disposed at the second end 640 of a torch receptacle 600, can comprise a plurality of conduits 650. In some embodiments, the conduits 650 allow power, gas and signals to pass through the plasma torch rotation assembly to the plasma arc torch simultaneously. The conduits 650 can also allow high voltage and currents to pass through the plasma torch rotation assembly to the plasma arc torch. In one embodiment, the conduits 650 are disposed within the outer housing and the inner component. In some embodiments a gas conduit tube 660 facilitates connection between the lead set and torch receptacle 600. As shown in FIG. 6B, the conduits can be all internal to the outer housing and inner component. This removes the need to use flanges to connect the internal components.

Figure 6C:
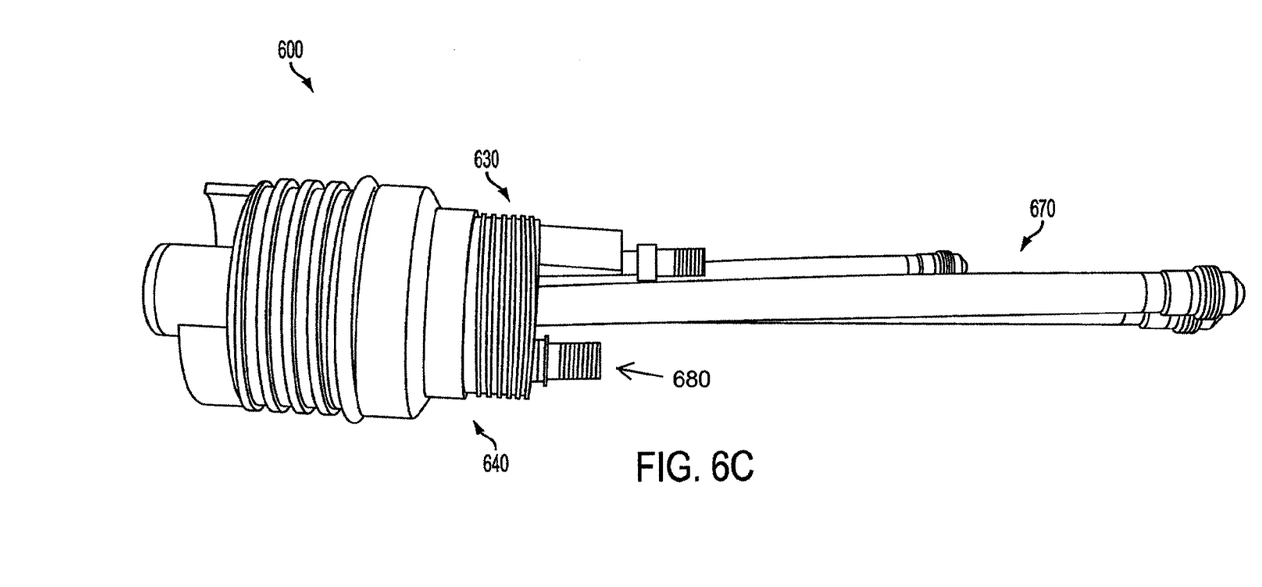
FIG. 6C is a side view of a long lead set connector of a torch receptacle, according to one embodiment of the present invention.

FIG. 6C is a side view of a long lead set connector of a torch receptacle 600, according to one embodiment of the present invention. The lead set connector 630, disposed at the second end 640 of a torch receptacle 600, can comprise a plurality of conduits 680. The conduits 680 can comprise conduit tubes 670. The conduit tubes can provide a conduit for one or more gases from the lead seat to the plasma arc torch. Conduit tubes can also provide a conduit for power to be supplied to the plasma arc torch. In some embodiments the conduit tubes facilitate connection between the lead set and the torch receptacle 600. The conduit tubes can be any length that can facilitate connection between the lead set and the torch receptacle. For example, in some embodiments, a torch sleeve is placed between the lead set and the rotation assembly. The torch sleeve can be anywhere from about 3 inches to about 24 inches in length. When the torch sleeve is short, for example, about one inch, the shorter gas conduit tubes 660 of FIG. 6B can be used. When the torch sleeve is long, for example, about 12 or about 24 inches, the longer gas conduit tubes 670 of FIG. 6C can be used. The longer gas conduit tubes 670 can pass through the length of the torch sleeve to connect with gas tubes of the lead set.

Figure 7:
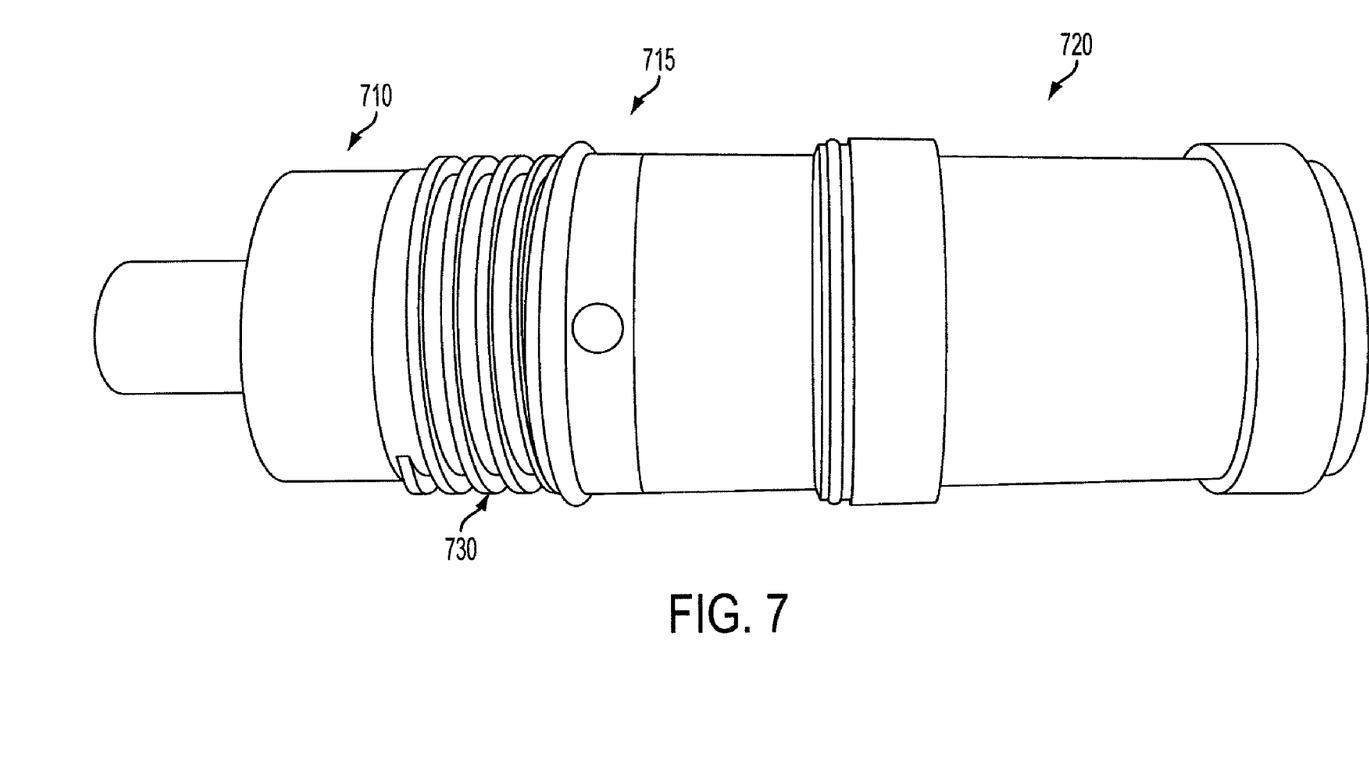
FIG. 7 is a side view of an embodiment of the invention, depicting a torch receptacle disposed near a first end of an inner component.

FIG. 7 is a side view of an embodiment of the invention, depicting a torch receptacle 710 disposed near a first end 715 of an inner component 720. In some embodiments the threads 730 of the torch receptacle 710 mate with the threads at the first end 715 of the inner component 720. Other fastening methods can be used to mate the torch receptacle 710 with the threads at the first end 715 of the inner component 720.

Another aspect of the invention features a method of installing a plasma torch rotation assembly. In some embodiments the method involves providing a plasma torch rotation assembly, for example, the any one of the plasma torch rotation assemblies described above with respect to FIGS. 2-7. In some embodiments the method involves receiving a lead set via the receiving portion of the inner component. The lead set can also be received into one end of a torch sleeve. The other end of the torch sleeve can then be connected to the inner component. In some embodiments the method involves fixedly securing the outer housing to the torch mount of the plasma arc torch cutting system. The outer housing can be fixedly secured by a clamp (for example a C-shaped clamp), bolts, or other fastener. The outer housing can also be adapted to be removable from the torch mount. The method can also involve connecting the torch adapter of the inner component to a plasma arc torch. In some embodiments the method also involves connecting a torch receptacle to one end of a torch adapter and connecting a plasma arc torch to the other end of the torch receptacle.

The method steps are not limited to any particular order. For example, the plasma arc torch can be connected prior to securing the outer housing to the torch mount. In addition, the outer housing can be secured to the torch mount prior to receiving a lead set via the receiving portion of the inner component. The method can also be used for new or existing plasma torch systems. The rotation assembly is universal and the mounting surface of the outer housing can be sized to be received by a variety of standardized torch mounts. This simplifies installation of the plasma torch rotation assembly on plasma torch systems that are already in use in the industry.

Another aspect of the invention features a universal rotational plasma torch sleeve connectable to a plasma torch mount. The torch sleeve can comprise a torch sleeve body that has a first end a second end. In some embodiments, the first end of the torch sleeve body is adapted to receive a plasma torch. The second end of the torch sleeve body can be adapted to couple to at least a portion of a lead set. The mounting surface of the torch sleeve body can be rotatable relative to the torch sleeve body. In some embodiments the mounting surface is capable of rotating 360 degrees relative to the torch sleeve body. In other embodiments, the mounting surface is fully rotational or infinitely rotational relative to the torch sleeve body. The mounting surface can be sized to be received by a variety of standardized torch mounts that are designed to hold and manipulate non-rotational torch sleeves. This allows the rotational plasma torch sleeve to be implemented on existing systems that have non-rotational torch sleeves with minimal effort, no customization, and minimal down time of the plasma system as a whole. In addition, the rotational plasma torch sleeve can be easily implemented on existing systems that have non-rotational torch sleeves because the diameter of the rotational plasma torch sleeve can be sized to be comparable to non-rotational torch sleeves that are currently in use. For example, the diameter can be from about 1 inch to about 4 inches. Such sleeves can also have lengths between six inches and three feet. For longer sleeves, the rotational mount need only occupy a small portion of the length, e.g., four to six inches.

While the invention has been particularly shown and described with reference to specific preferred embodiments, it should be understood by those skilled in the art that various changes in from and detail may be made therein without departing from the spirit and scope of the invention as defined by the following claims. For example, the rotational assembly can be affixed, either permanently or revesrsibly, at one or both ends to adjacent system components. It can also be integrally formed with various mounts, system gantries, and/or other system components.

What is claimed is:
1. A plasma torch rotation assembly comprising:
   an outer housing having a mounting surface adapted to be fixedly coupled to a torch mount on a plasma arc torch motion driving system;
   an inner component disposed at least partially within the outer housing, the inner component having a first end and a second end;

a bearing structure disposed between the outer housing and the inner component, the bearing structure facilitating a rotational movement of the outer housing with respect to the inner component, about a longitudinal axis of the rotation assembly;

a torch adapter disposed near the first end of the inner component;

a plasma torch receptacle adapted to mate with the torch adapter, the plasma torch receptacle comprising:

a torch connector at a first end of the plasma torch receptacle to mate with a plasma arc torch, the torch connector comprising a quick disconnect, and a lead set connector at a second end of the plasma torch receptacle to mate with a lead set; and a receiving portion disposed at the second end of the inner component, the receiving portion adapted to receive at least a portion the lead set.

2. The plasma torch rotation assembly of claim 1 wherein the outer housing is adapted to be fixedly coupled within the torch mount.

3. The plasma torch rotation assembly of claim 1 wherein the torch mount is integrated into the outer housing.

4. The plasma torch rotation assembly of claim 1 wherein the outer housing includes a fastener pattern adapted to align and affix the outer housing to the torch motion driving system.

5. The plasma torch rotation assembly of claim 1 further comprising a plurality of conduits disposed within the outer housing and the inner component.

6. The plasma torch rotation assembly of claim 1 wherein the bearing structure has a radial tolerance limit of between about 0.001 and about 0.002 inches.

7. The plasma torch rotation assembly of claim 1 wherein the bearing structure is at least one of a journal bearing, sleeve bearing, rifle bearing, bushing, ball bearing, or roller bearing.

8. The plasma torch rotation assembly of claim 1 wherein the bearing structure facilitates 360 degree rotational movement of the outer housing with respect to the inner component about the longitudinal axis of the rotation assembly.

9. The plasma torch rotation assembly of claim 1 wherein the inner component is fully rotational relative to the outer housing about the longitudinal axis of the rotation assembly.

10. The plasma torch rotation assembly of claim 1 wherein the bearing structure includes a solid polymer.

11. The plasma torch rotation assembly of claim 1 wherein the outer housing and the inner component are generally cylindrical.

12. The plasma torch rotation assembly of claim 1 wherein the plasma torch rotation assembly is permanently affixed to or integrally formed with the lead set.

13. The plasma torch rotation assembly of claim 1 wherein the plasma torch rotation assembly is permanently affixed to or integrally formed with the plasma torch body.

14. The plasma torch rotation assembly of claim 1 wherein the plasma torch rotation assembly is permanently affixed to or integrally formed with a plasma torch sleeve.

15. A method of installing a plasma torch rotation assembly comprising:

providing the plasma torch rotation assembly of claim 1;

receiving a lead set via the receiving portion of the inner component;

fixedly securing the outer housing to the torch mount of the plasma arc torch cutting system;

connecting the torch adapter of the inner component to the plasma arc torch.

16. A plasma torch rotation assembly comprising:

an outer housing having a mounting surface adapted to be fixedly coupled to a torch mount on a plasma arc torch motion driving system;

an inner component disposed at least partially within the outer housing, the inner component having a first end and a second end;

a means for providing a rotational movement of the outer housing with respect to the inner component, about a longitudinal axis of the rotation assembly;

a torch adapter disposed near the first end of the inner component, a plasma torch receptacle adapted to mate with the torch adapter, the plasma torch receptacle comprising:

a torch connector at a first end of the plasma torch receptacle to mate with a plasma arc torch, the torch connector comprising a quick disconnect, and a lead set connector at a second end of the plasma torch receptacle to mate with a lead set; and a receiving portion disposed at the second end of the inner component, the receiving portion adapted to receive the lead set.

17. A universal rotational plasma torch sleeve connectable to a plasma torch mount, the torch sleeve comprising:

a torch sleeve body having a first end and a second end, the first end of the torch sleeve body adapted to receive a plasma torch receptacle, the torch receptacle comprising:

a torch connector at a first end of the plasma torch receptacle to mate with a plasma arc torch, the torch connector comprising a quick disconnect, and a lead set connector at a second end of the plasma torch receptacle to mate with at least a portion of a lead set, the second end of the torch sleeve body adapted to couple to at least a portion of the lead set, and a mounting surface of the torch sleeve body rotatable relative to the torch sleeve body, the mounting surface sized to be received by a variety of standardized torch mounts that are designed to hold and manipulate non-rotational torch sleeves.

* * * * *